United States Patent
Tomla et al.

(10) Patent No.: US 11,104,854 B2
(45) Date of Patent: Aug. 31, 2021

(54) HIGH TEMPERATURE TOLERANT, MODIFIED CATIONIC STARCH-BASED ADDITIVES FOR WATER CLARIFICATION

(71) Applicant: Baker Hughes, LLC, Houston, TX (US)

(72) Inventors: Christabel Tomla, Katy, TX (US); Wojciech Jakubowski, Sugar Land, TX (US); Jason J. Thomas, Edmonton (CA)

(73) Assignee: Baker Hughes Holdings LLC, Houston, TX (US)

( * ) Notice: Subject to any disclaimer, the term of this patent is extended or adjusted under 35 U.S.C. 154(b) by 0 days.

(21) Appl. No.: 16/517,241

(22) Filed: Jul. 19, 2019

(65) Prior Publication Data

US 2020/0024527 A1    Jan. 23, 2020

Related U.S. Application Data

(60) Provisional application No. 62/702,071, filed on Jul. 23, 2018.

(51) Int. Cl.
| | |
|---|---|
| *C10G 33/04* | (2006.01) |
| *C08L 3/04* | (2006.01) |
| *C08L 33/26* | (2006.01) |
| *C02F 1/40* | (2006.01) |
| *C02F 1/68* | (2006.01) |
| *C08L 33/08* | (2006.01) |

(52) U.S. Cl.
CPC ............... *C10G 33/04* (2013.01); *C02F 1/40* (2013.01); *C02F 1/68* (2013.01); *C08L 3/04* (2013.01); *C08L 33/08* (2013.01); *C08L 33/26* (2013.01); *C10G 2300/80* (2013.01)

(58) Field of Classification Search
CPC ....................................................... C10G 33/04
See application file for complete search history.

(56) References Cited

U.S. PATENT DOCUMENTS

| | | | | |
|---|---|---|---|---|
| 2016/0032197 A1* | 2/2016 | Weisner | ................. | C10G 33/04 252/194 |
| 2019/0374877 A1* | 12/2019 | Weisner | ................. | C10G 33/04 |

FOREIGN PATENT DOCUMENTS

| | | | |
|---|---|---|---|
| WO | 2004-041732 A1 | 5/2004 | |
| WO | 2007047481 A2 | 4/2007 | |
| WO | WO-2007047481 A2 * | 4/2007 | ............... C08L 3/08 |
| WO | 2010011867 A1 | 1/2010 | |
| WO | 2014127083 A1 | 8/2014 | |
| WO | WO-2014127083 A1 * | 8/2014 | ............ C02F 1/5245 |

OTHER PUBLICATIONS

Chiu, Chung-wai, et al., "Modification of Starches", Chemistry and Technology, Third Edition, 2009, 629-655.

* cited by examiner

*Primary Examiner* — Randy Boyer
(74) *Attorney, Agent, or Firm* — Mossman, Kumar & Tyler, P.C.

(57) ABSTRACT

The present disclosure is directed to additives comprising modified cationic starches that may be applied to a production fluid at high temperatures, such as temperatures ranging from about 80° C. to about 300° C., for separating water from an emulsion in the production fluid.

20 Claims, 3 Drawing Sheets

HIGH TEMPERATURE TOLERANT, MODIFIED CATIONIC STARCH-BASED ADDITIVES FOR WATER CLARIFICATION

CROSS-REFERENCE TO RELATED APPLICATION

This application claims the benefit of Provisional Patent Application No. 62/702,071 filed Jul. 23, 2018, which is incorporated by reference herein in its entirety.

TECHNICAL FIELD

The present invention relates to using modified cationic starch-based additives for separating water from emulsions in production fluids, and more particularly applying these additives to the fluid at high temperatures.

BACKGROUND

In a standard Steam Assisted Gravity Drainage ("SAGD") system (1), which is shown in FIG. 1, steam is injected below ground in oil sands deposits and bitumen (i.e. "oil") is recovered through a pair of horizontal wells located in individual well pads (2) by heating the bitumen above its pour point. The temperature of the recovered bitumen and produced water is upwards of 200° C. and the result is a stable complex emulsion of hydrocarbons and water. The recovered production fluid is then cooled in one or more inlet production coolers (3) and sent to a first phase separation vessel (a two- or three-phase separation vessel depending on the facility), such as a free water knockout separator ("FWKO") (4) to separate the bitumen from the produced water and gas or the liquid from gas. Once separated, the bitumen is sent for further processing (7). From the separation vessel (4), the produced water is sent through one or more produced water coolers (5), which are usually shell and tube heat exchangers or spiral heat exchangers, to cool the water. The produced water, after being cooled in the water cooler(s) (5), is then sent to further water treatment (6) to remove any oil remaining in the produced water, after which the water is converted to steam for reuse.

To help resolve the complex emulsion in the produced fluids and to separate water from oil in the emulsion contained in produced fluids, fluid separation chemicals, such as water clarifiers and emulsion breakers, are injected at various locations in the process.

However, conventional water clarifier and emulsion breaker chemistries are often not designed to be applied in high temperature scenarios, or, when introduced at high temperatures or introduced into fluid streams that are hot, the ability of conventional chemistries to remove or separate water from an emulsion is diminished.

Thus, it would be desirable to develop additives for separating water from emulsions that maintain their performance at high temperatures.

SUMMARY

There is provided, in one non-limiting embodiment, a method for separating water from an emulsion comprising hydrocarbons and water, the method comprising: introducing an additive into a fluid containing the emulsion, the additive comprising an effective amount of a modified cationic starch to separate at least a portion of the water from the emulsion, wherein the temperature of the fluid or the additive ranges from about 80° C. to about 300° C.

There is additionally provided, in another non-restrictive version, a treated fluid having a temperature ranging from about 80° C. to about 300° C. made up of: (1) a fluid containing an emulsion, the emulsion comprising hydrocarbons and water, and (2) an additive comprising a modified cationic starch.

In some embodiments, the modified cationic starch is a quaternary ammonium cationic starch.

DETAILED DESCRIPTION

The present invention relates to the use of additives comprising modified cationic starches, either alone or in combination with water clarifier compounds, to separate water from an emulsion in production fluids. It has been found that modified cationic starches, either alone or blended with a water clarifier compound, are effective for water clarification of emulsions, crude oil emulsions, and other production fluids even when these additives are applied at high temperatures.

The production fluid may be a hybrid fluid containing both a hydrocarbon fluid and an aqueous fluid, such as the stable complex emulsion fluid that is recovered through the well pads in a SAGD system or any other oil-in-water emulsion, or an oil-in-brine emulsion, and combinations thereof. As the fluid flows through various stages and segments of the SAGD system, the production fluid may either be a hydrocarbon fluid, an aqueous fluid, or water, or combinations of these. An aqueous fluid may also be fluids having an aqueous continuous phase where the aqueous continuous phase can be all water, brine, seawater, or an injection fluid that comprises recycled production water that is injected back into a subterranean formation, and combinations thereof. Hydrocarbon fluids may also be oil-based fluids, which are fluids having a non-aqueous continuous phase where the non-aqueous continuous phase is all oil, a non-aqueous fluid, a water-in-oil emulsion, a water-in-non-aqueous emulsion, a brine-in-oil emulsion, a brine-in-non-aqueous emulsion, a seawater-in-non-aqueous emulsion. Also, in oil-based fluids, solid particles may be suspended in a continuous phase consisting of oil or another non-aqueous fluid. Water or brine can be emulsified in the oil; therefore, the oil is the continuous phase. In oil-based fluids, the oil may consist of any oil or water-immiscible fluid that may include, but is not limited to, diesel, mineral oil, esters, refinery cuts and blends, or alpha-olefins.

"System" is broadly defined herein to be an oilfield, subterranean, or treatment facility or operation that includes a fluid and any components therein (e.g. pipes or conduits where the fluid may flow through or alongside).

In a non-limiting example, a modified cationic starch-based additive may be introduced into the SAGD system by injecting the additive into the production fluid flowing through the SAGD system at one or more points or locations along the flow path in the SAGD system.

Figure 1:
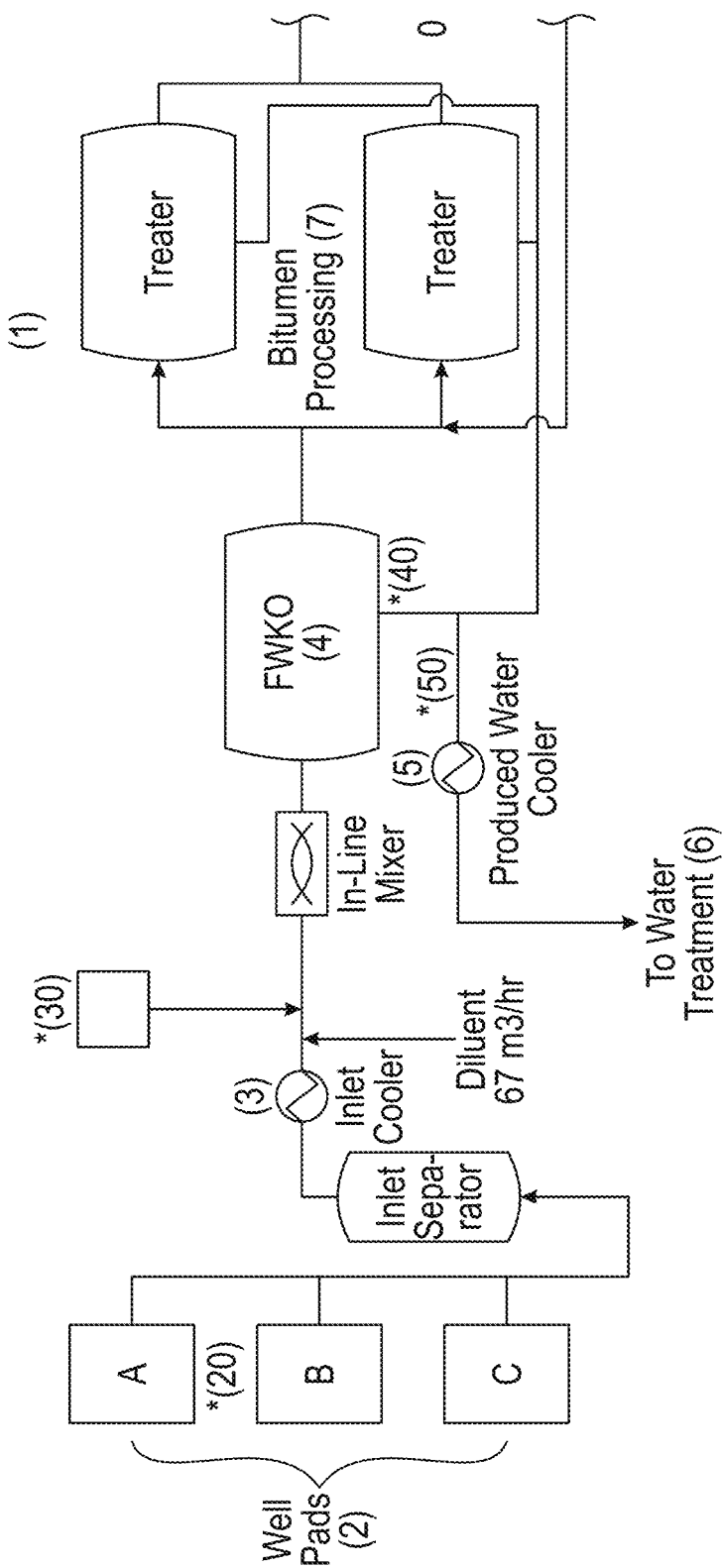
FIG. 1 is a schematic representation of a portion of a standard Steam Assisted Gravity Drainage ("SAGD") production system.

Referring to FIG. 1, the injection points for the additive may include, but are not limited to well pad (20), upstream of a separation vessel (30), at an outlet of the separation vessel (40), upstream of one or more production coolers located downstream of the separation vessel (50), and combinations thereof. In FIG. 1, these injection points are further indicated with an asterisk (*).

Suitable starches from which the modified cationic starch may be derived include, but are not limited to, corn starches, potato starches, tapioca starches, sago starches, rice starches, wheat starches, waxy maize starches, grain sorghum starches, grain starches, plant starches, carbohydrates, lignin, polysaccharides, and combinations thereof.

Chemical modifications of starch involve the exploitation of the hydroxyl group present in starch to bring about the desired result. This may include derivatization methods such as etherification, esterification and crosslinking (with crosslinking agents like epichlorohydrin), oxidation, cationization, and grafting of starch. Modification can also occur by physical methods (pre-gelatinization of starch, heating of starch in aqueous alcohol with high pressure and high temperature) or enzymatic methods. In one embodiment, the modified cationic starches useful for separating water are quaternary ammonium cationic starches formed by reacting a starch with a quaternary ammonium compounds such as 2,3-epoxypropyltrimethylammonium chloride or N-(3-chloro-2-hydroxypropyltrimethylammonium chloride. The positive ionic charge can also be obtained by reacting with functional groups such as imino, amino, sulfonium, or phosphonium. In certain embodiments, starch-based products in combination with inorganic materials, such as polyaluminum chloride and aluminum chloride hydroxyl sulfate, may be used.

In exemplary embodiments, one or more of the aforementioned modified cationic starches may be used alone or in combination with or blended with water clarifier compounds.

Suitable water clarifiers may include, but not necessarily be limited to, polycondensate based on N,N'-bis[3-(dimethylamino)propyl]urea, polyacrylate copolymers, polyacrylamide copolymers, poly(acrylate/acrylamide) copolymers, polycondensate based on alkanolamines, in particular polycondensates based on triethanolamines, dithiocarbamates, and combinations thereof.

In a non-restrictive embodiment, the additive is a blend or combination comprising from about 36 wt. % to about 95 wt. % modified cationic starch and from about 3 wt. % to about 50 wt. % water clarifier compound, based on the total amount of components in the additive. In an alternative embodiment, based on the total amount of solid active components, the modified cationic starch is present in an amount ranging from about 5 wt. % to about 60 wt. %, preferably from about 10 wt. % to about 40 wt. %, and the water clarifier is present in an amount ranging from about 0.1 wt. % to about 30 wt. %, preferably from about 1 wt. % to about 10 wt. %.

The modified cationic starch-based additives described herein are capable of separating water from an emulsion when heated to high temperatures or when introduced into fluids that are at high temperatures. In a non-restrictive embodiment, the temperature of the fluid or the additive may range from about 80° C. independently to about 300° C. independently, preferably from about 90° C. independently to about 220° C. independently. As used herein with respect to a range, the word "independently" means that any threshold may be combined any other threshold to give a suitable alternative range.

In another non-limiting embodiment, the temperature of the production fluid into which the modified cationic starch-based additives may be introduced or the temperature of the modified cationic starch-based additives may range from about 119° C. independently to about 200° C. independently. The pH of the fluid to which the additive may be introduced may range from 3 to 7.

The amount of modified cationic starch-based additive introduced to the production fluid or other emulsion may be from about 2.5 ppm independently to about 200 ppm, alternatively from about 20 ppm independently to about 150 ppm based on the total amount of water in the production fluid.

It will be appreciated that this range of amounts may represent additive amounts that are lower than the amounts of conventional or traditional water clarifier chemistries typically applied for successful separation of water from an emulsion.

Success is obtained if better or more separation occurs in the presence of the additives described herein than in the absence of the additive.

The additive may increase the amount of water separation. That is, it is not necessary for water to be completely or fully separate from the emulsion for the additives discussed herein to be considered effective, although complete separation is a desirable goal.

The invention will be further described with respect to the following Examples, which are not meant to limit the invention, but rather to further illustrate the various embodiments.

EXAMPLES

A few modified cationic starch-based additives of the type described herein were heated to a temperature of ~210° C. and applied to samples of fluids containing raw emulsions with a Basic Sediment & Water ("BS&W") values ranging from 65% to 80% in bottle tests to evaluate their performance. The performance of the exemplary modified cationic starch-based additives of the type described herein was compared to the performance of conventional water clarifiers that were applied at the same high temperatures (~210° C.) and same amounts (40 ppm to 100 ppm), and in some instances, that were applied in higher amounts (150 ppm to 200 ppm) in the bottle test.

Testing was conducted on sample production fluids injected with additives comprising both a quaternary ammonium cationic starch with a water clarification compound of a kind described herein, such as an acrylamide-based copolymer or a urea-based polycondensate, and an additive containing only quaternary ammonium cationic starches.

Results from the bottle testing conducted showed, overall, that additives comprising the modified cationic starches were the top performers.

Figure 2:
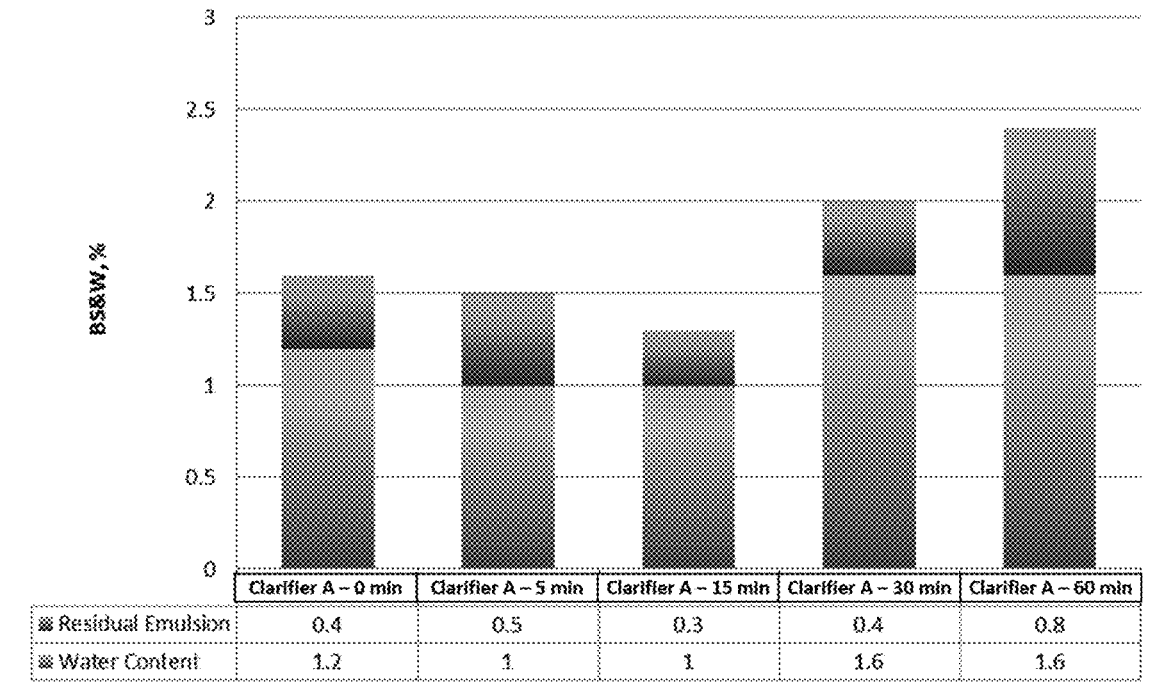
FIG. 2 is a set of graphs comparing the top oil dehydration of an exemplary additive of the kind described herein to the top oil dehydration of a conventional/incumbent water clarifier compound at a high temperature.
Figure 2:
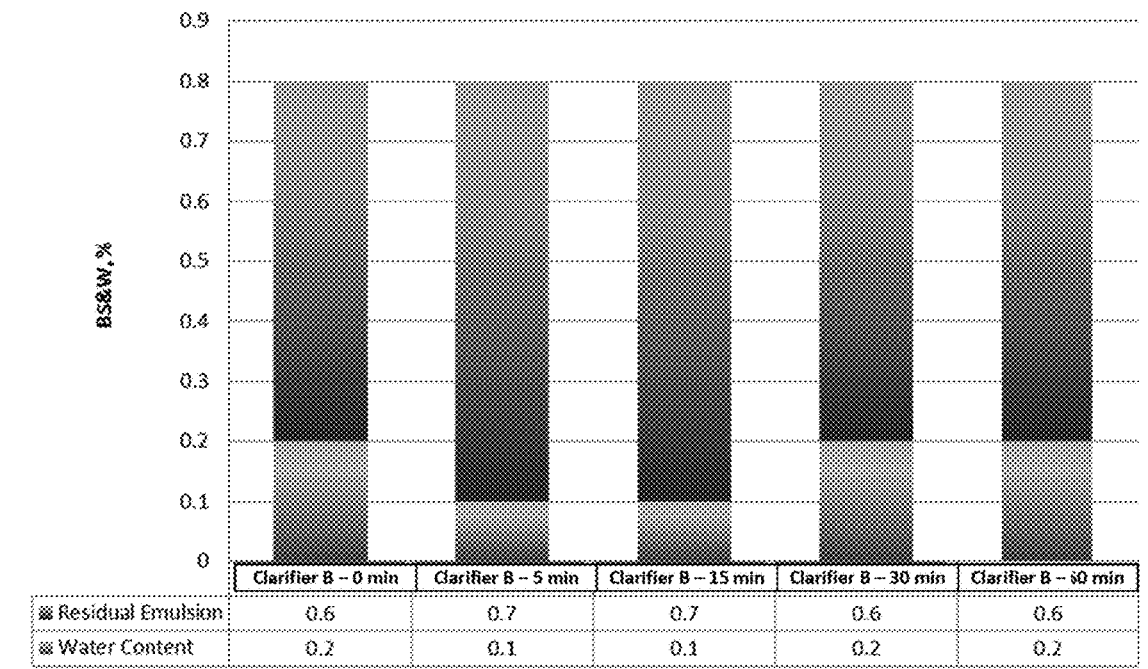
Figure 3:
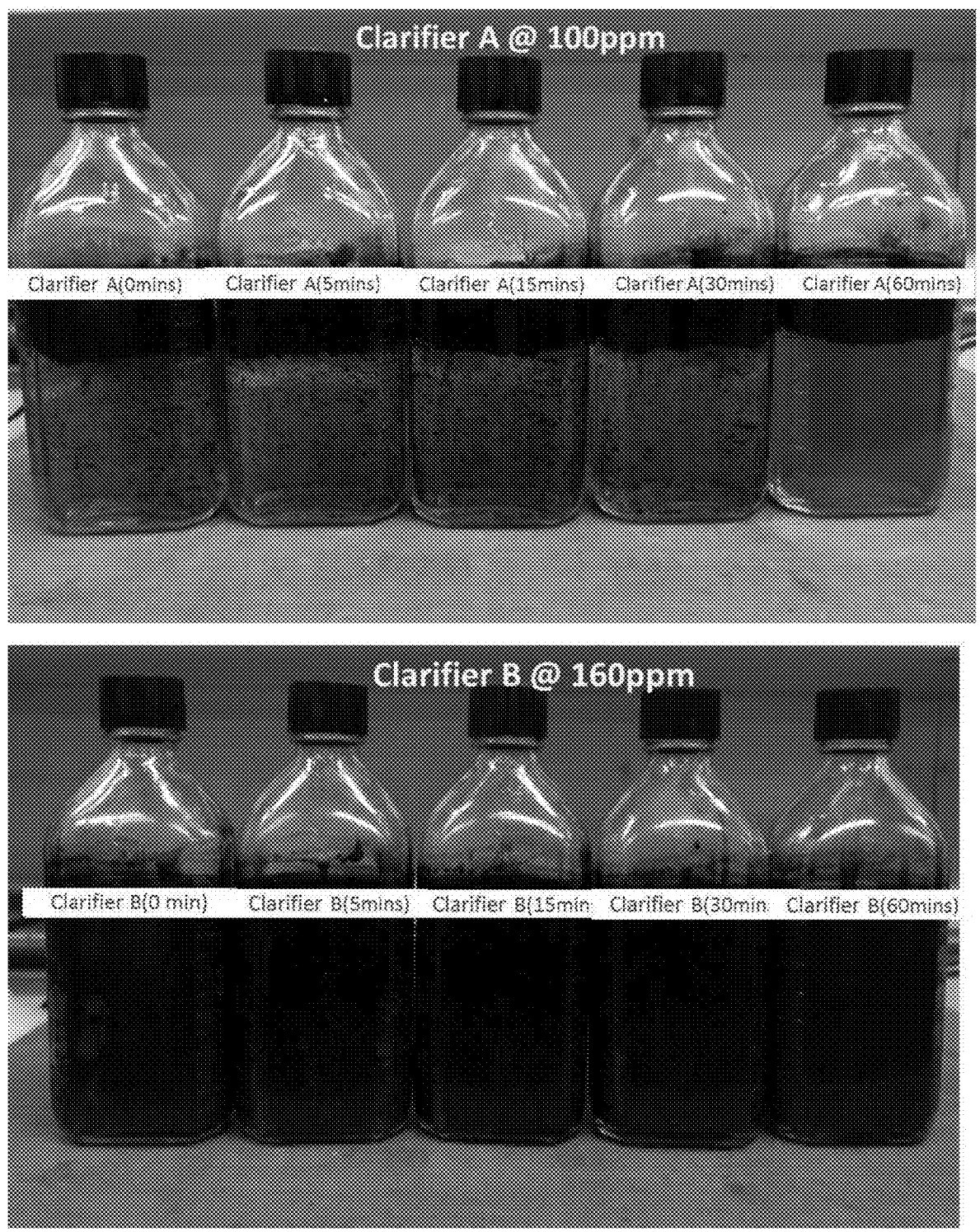
FIG. 3 is a set of photographic illustrations comparing the water separation performance of an exemplary additive of the kind described herein to the water separation performance of a conventional/incumbent water clarifier compound at a high temperature.

As shown in FIG. 2 and FIG. 3, when bottle tested, samples containing a combination of a quaternary ammonium cationic starch and a urea-based polycondensate (Clarifier A) demonstrated better top oil dehydration and water separation than incumbent chemistries made up of an acrylamide-based copolymer (Clarifier B).

In the foregoing specification, the invention has been described with reference to specific embodiments thereof.

However, it will be evident that various modifications and changes can be made thereto without departing from the broader scope of the invention as set forth in the appended claims. Accordingly, the specification is to be regarded in an illustrative rather than a restrictive sense. For example, specific modified cationic starches, water clarifier compounds, fluids, additive, process or system conditions, and system equipment, and the like falling within the claimed parameters, but not specifically identified or tried, are expected to be within the scope of this invention.

The present invention may suitably comprise, consist of or consist essentially of the elements disclosed and may be practiced in the absence of an element not disclosed. For instance, the additive for useful for separating water from an emulsion that may be presented in a fluid or introduced to a fluid may (1) comprise, consist essentially of, or consist of a modified cationic starch, (2) may comprise, consistent essentially of, consist of a modified cationic starch and a water clarifier product or (3) may comprise, consist essentially of, or consist of a quaternary ammonium cationic starch. Further, the treated fluid may comprise, consist essentially of, or consist of a fluid comprising, consisting essentially of, or consisting of, an emulsion, and further an effective amount of the additive to separate at least a portion of the water from the emulsion.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

To the extent used herein, the singular forms "a," "an," and "the" are intended to include the plural forms as well, unless the context clearly indicates otherwise.

To the extent used herein, the term "about" in reference to a given parameter is inclusive of the stated value and has the meaning dictated by the context (e.g., it includes the degree of error associated with measurement of the given parameter).

To the extent used herein, the term "and/or" includes any and all combinations of one or more of the associated listed items.

To the extent used herein, relational terms, such as "first," "second," "top," "bottom," "upper," "lower," "over," "under," etc., are used for clarity and convenience in understanding the disclosure and do not connote or depend on any specific preference, orientation, or order, except where the context clearly indicates otherwise.

To the extent used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

What is claimed is:

1. A method for separating water from an emulsion comprising hydrocarbons and water, the method comprising:
    introducing an additive into a fluid containing the emulsion, the additive comprising an effective amount of a modified cationic starch to separate at least a portion of the water from the emulsion, wherein after the introducing the temperature of the fluid and the additive ranges from about 119° C. to about 300° C.; and
    separating at least a portion of the water from the emulsion.

2. The method of claim 1, wherein the fluid is a production fluid selected from the group consisting of a hydrocarbon stream, an aqueous stream, and combinations thereof.

3. The method of claim 1, wherein the additive further comprises a water clarifier compound.

4. The method of claim 3, wherein the water clarifier compound is selected from a group consisting of polycondensate based on N,N'-bis[3-(dimethylamino)propyl]urea, polyacrylate copolymers, polyacrylamide copolymers, poly(acrylate/acrylamide) copolymers, polycondensate based on alkanolamines, and combinations thereof.

5. The method of claim 1, wherein the modified cationic starch is derived from a starch selected from a group consisting of corn starches, potato starches, tapioca starches, sago starches, rice starches, wheat starches, waxy maize starches, grain sorghum starches, grain starches, plant starches, carbohydrates, lignin, polysaccharides, and combinations thereof.

6. The method of claim 1, wherein the modified cationic starch is a quaternary ammonium cation starch.

7. The method of claim 3, wherein the additive comprises 36 wt. % to about 95 wt. % modified cationic starch.

8. The method of claim 3, where in the additive comprises 3 wt. % to about 50 wt. % water clarifier compound.

9. The method of claim 1, wherein the effective amount of the additive ranges from about 2.5 ppm to about 200 ppm based on the total amount of water in the fluid.

10. The method of claim 1, wherein the additive is introduced at a location selected from the group consisting of at a well pad, upstream of a separation vessel, at an outlet of the separation vessel, upstream of one or more production coolers located downstream of the separation vessel, and combinations thereof.

11. A method for separating water from an emulsion comprising hydrocarbons and water, the method comprising:
    introducing an additive into a fluid containing the emulsion, the additive comprising:
        an effective amount of a modified cationic starch to separate at least a portion of the water from the emulsion, and
        a water clarifier compound selected from a group consisting of polycondensate based on N,N'-bis[3-(dimethylamino)propyl]urea, polyacrylate copolymers, polyacrylamide copolymers, poly(acrylate/acrylamide) copolymers, polycondensate based on alkanolamines, and combinations thereof; and
    separating at least a portion of the water from the emulsion
    wherein:
        after the introducing the temperature of the fluid and the additive ranges from about 119° C. to about 300° C.; and the fluid is a production fluid selected from the group consisting of a hydrocarbon stream, an aqueous stream, and combinations thereof.

12. The method of claim 11, wherein the modified cationic starch is derived from a starch selected from a group consisting of corn starches, potato starches, tapioca starches, sago starches, rice starches, wheat starches, waxy maize starches, grain sorghum starches, grain starches, plant starches, carbohydrates, lignin, polysaccharides, and combinations thereof.

13. The method of claim 11, wherein the modified cationic starch is a quaternary ammonium cation starch.

14. The method of claim 11, wherein the additive comprises 36 wt. % to about 95 wt. % modified cationic starch.

15. The method of claim 11, where in the additive comprises 3 wt. % to about 50 wt. % water clarifier compound.

16. The method of claim 11, wherein the effective amount of the additive ranges from about 2.5 ppm to about 200 ppm based on the total amount of water in the fluid.

17. A method for separating water from an emulsion comprising hydrocarbons and water, the method comprising:
introducing an additive into a fluid containing the emulsion, the additive comprising:
from about 2.5 ppm to about 200 ppm based on the total amount of water in the fluid in an amount effective to separate at least a portion of the water from the emulsion, wherein the modified cationic starch is derived from a starch selected from a group consisting of corn starches, potato starches, tapioca starches, sago starches, rice starches, wheat starches, waxy maize starches, grain sorghum starches, grain starches, plant starches, carbohydrates, lignin, polysaccharides, and combinations thereof; and
separating at least a portion of the water from the emulsion;
wherein after the introducing the temperature of the fluid and the additive ranges from about 119° C. to about 300° C.

18. The method of claim 17, wherein the additive further comprises a water clarifier compound selected from a group consisting of polycondensate based on N,N'-bis[3-(dimethylamino)propyl]urea, polyacrylate copolymers, polyacrylamide copolymers, poly(acrylate/acrylamide) copolymers, polycondensate based on alkanolamines, and combinations thereof.

19. The method of claim 17, wherein the modified cationic starch is a quaternary ammonium cation starch.

20. The method of claim 17, wherein the additive is introduced at a location selected from the group consisting of at a well pad, upstream of a separation vessel, at an outlet of the separation vessel, upstream of one or more production coolers located downstream of the separation vessel, and combinations thereof.

* * * * *